(12) United States Patent
Derks et al.

(10) Patent No.: US 8,514,071 B2
(45) Date of Patent: Aug. 20, 2013

(54) REAL-TIME METHOD AND SYSTEM FOR LOCATING A MOBILE OBJECT OR PERSON IN A TRACKING ENVIRONMENT

(75) Inventors: Harry G. Derks, Holland, MI (US); William S. Buehler, Zeeland, MI (US); Michael B. Hall, Holland, MI (US); Ann Elizabeth Hall, legal representative, Holland, MI (US)

(73) Assignees: Versus Technology, Inc., Traverse City, MI (US); Fleetwood Group, Inc., Holland, MI (US)

( * ) Notice: Subject to any disclaimer, the term of this patent is extended or adjusted under 35 U.S.C. 154(b) by 612 days.

(21) Appl. No.: 12/845,228

(22) Filed: Jul. 28, 2010

(65) Prior Publication Data
US 2012/0025973 A1    Feb. 2, 2012

(51) Int. Cl.
*G08B 1/08*    (2006.01)

(52) U.S. Cl.
USPC ............. 340/539.13; 340/539.1; 340/539.11

(58) Field of Classification Search
USPC .................................................. 340/539.13
See application file for complete search history.

(56) References Cited

U.S. PATENT DOCUMENTS

| | | | |
|---|---|---|---|
| 4,048,729 A | 9/1977 | Derks | |
| 4,392,132 A | 7/1983 | Derks | |
| 4,868,859 A | 9/1989 | Sheffer | |
| 4,906,853 A | 3/1990 | Linwood et al. | |
| 5,017,794 A | 5/1991 | Linwood et al. | |
| 5,027,314 A | 6/1991 | Linwood et al. | |
| 5,027,383 A | 6/1991 | Sheffer | |
| 5,093,786 A | 3/1992 | Derks | |
| 5,119,104 A | 6/1992 | Heller | |
| 5,131,019 A | 7/1992 | Sheffer et al. | |
| 5,276,496 A | 1/1994 | Heller et al. | |
| 5,355,222 A | 10/1994 | Heller et al. | |
| 5,379,213 A | 1/1995 | Derks | |
| 5,387,993 A | 2/1995 | Heller et al. | |
| 5,548,637 A | 8/1996 | Heller et al. | |
| 5,572,195 A | 11/1996 | Heller et al. | |
| 5,724,357 A | 3/1998 | Derks | |
| 5,883,582 A | 3/1999 | Bowers et al. | |
| 5,917,425 A * | 6/1999 | Crimmins et al. | 340/8.1 |
| 5,929,777 A | 7/1999 | Reynolds | |
| 5,929,779 A | 7/1999 | MacLellan et al. | |
| 6,021,119 A | 2/2000 | Derks et al. | |

(Continued)

OTHER PUBLICATIONS

International Search Report and Written Opinion; International Application No. PCT/US2011/45461; mailed Dec. 12, 2011.

(Continued)

*Primary Examiner* — Kerri McNally
(74) *Attorney, Agent, or Firm* — Brooks Kushman P.C.

(57) ABSTRACT

A real-time method and system for locating a mobile object or person in a tracking environment. The method includes modulating a first carrier signal with a first packet including a first set of data to obtain a modulated first signal and transmitting the first signal. The first signal contains the first packet and has a first precision and a first range within the environment. The steps of modulating and transmitting are repeated until a modulated second signal is received within a time period after the step of transmitting. The second signal contains a second packet including a second set of data and has a second precision and a second range within the environment. The second signal is demodulated to obtain the second packet. Location is determined within the environment based on the second packet.

40 Claims, 11 Drawing Sheets

(56) References Cited

U.S. PATENT DOCUMENTS

| | | | |
|---|---|---|---|
| 6,069,557 A | 5/2000 | Anglin, Jr. et al. | |
| 6,104,295 A | 8/2000 | Gaisser et al. | |
| 6,154,139 A | 11/2000 | Heller | |
| 6,211,781 B1 * | 4/2001 | McDonald | 340/505 |
| 6,241,364 B1 | 6/2001 | Want et al. | |
| 6,462,656 B2 | 10/2002 | Ulrich et al. | |
| 6,577,877 B1 | 6/2003 | Charlier et al. | |
| 6,665,000 B1 | 12/2003 | Buehler et al. | |
| 6,788,199 B2 | 9/2004 | Crabtree et al. | |
| 6,838,992 B2 | 1/2005 | Tenarvitz | |
| 7,005,965 B2 | 2/2006 | Chen et al. | |
| 7,042,337 B2 | 5/2006 | Borders et al. | |
| 7,079,009 B2 | 7/2006 | Gallagher, III et al. | |
| 7,277,671 B2 | 10/2007 | Glass et al. | |
| 7,389,180 B2 | 6/2008 | Pearce et al. | |
| 7,403,111 B2 | 7/2008 | Tessier et al. | |
| 7,599,703 B2 | 10/2009 | Derks et al. | |
| 7,746,820 B2 | 6/2010 | Buehler et al. | |
| 7,747,261 B2 | 6/2010 | Derks | |
| 2002/0198986 A1 * | 12/2002 | Dempsey | 709/224 |
| 2004/0034581 A1 | 2/2004 | Hill et al. | |
| 2008/0094211 A1 | 4/2008 | Teller | |
| 2008/0218351 A1 | 9/2008 | Corrado et al. | |
| 2009/0121867 A1 | 5/2009 | Park et al. | |

OTHER PUBLICATIONS

International Search Report and Written Opinion; International Application No. PCT/US2011/45463; mailed Dec. 9, 2011.

* cited by examiner

REAL-TIME METHOD AND SYSTEM FOR LOCATING A MOBILE OBJECT OR PERSON IN A TRACKING ENVIRONMENT

CROSS-REFERENCE TO RELATED APPLICATIONS

This application is related to U.S. patent application entitled "Real-time Method and System for Determining and Validating Location of a Relocated Mobile Object or Person in a Tracking Environment" filed on the same day as this application. This application is also related to U.S. patent application entitled "Real-time Method and System for Locating a Mobile Object or Person in a Tracking Environment While Conserving Electrical Energy in a Battery-operated Tracking Tag Associated with the Object or Person" filed on Nov. 23, 2009 and having U.S. Ser. No. 12/623,667.

TECHNICAL FIELD

This invention relates to real-time methods and systems for locating a mobile object or person in a tracking environment and, in particular, to real-time methods and systems for locating a mobile object or person in a tracking environment in which a plurality of sensors are located.

BACKGROUND

Battery-operated (i.e. active) tracking badges and tags often emit radio-frequency (RF) and other signals such as ultrasonic or infrared (IR) signals. These signals are used to precisely establish the real-time location of mobile assets and people to which the badges and tags are affixed.

Typical fire rates for IR are set at every 3 seconds on badges and 9 seconds for asset tags. RF signals are typically set at every 12 seconds on each type of badge. Firing rates can be preselected. Since some tags feature a motion sensor, the tag will go to "sleep" (fire less often to save on battery life) when there is no movement.

Recent asset tag batteries may last up to three years, depending on their preselected firing rate. Patient/personnel tags have a shorter battery life because they are in use and firing signals more frequently than asset tags, consequently, badge batteries typically last up to 18 months. In any event, however, battery-operated tracking tags have a fixed energy budget.

U.S. patent publication 2008/0218351 discloses an RFID tag conservation method and system for active multi-modal RFID tags, illuminator/tag/reader systems, circuit architecture and operational algorithms for battery power conservation that extends tag battery life from a typical 6 months to >5 years. The system is particularly useful in asset and person tracking/inventory systems where power conservation is critical. The tag is configured with a microprocessor operational instruction set algorithm, modifiable on the fly via RF or IR, to synchronize a periodic tag awaken/sense envelope that overlaps the illuminator trigger pulse cycle and puts the tag into deep power conservation sleep for N periods of illuminator cycles. When the tag sees an illuminator signal with a different ID, or no illuminator signal at all, it transmits that anomaly via RF to a reader. This means the object or person with which the tag is associated has been moved out of the original illuminator field of view, permitting near real-time investigation and tracking.

The following U.S. Pat. Nos. are related to at least one embodiment of the invention: 6,154,139; 6,104,295; 5,027,314; 5,572,195; 5,548,637; 5,119,104; 5,017,7984; 4,906,853; 5,387,993; 5,355,222; 5,276,496; 5,131,019; 5,027,383; 4,868,859; 6,838,992 and 6,462,656.

The following U.S. Pat. Nos. are also related to at least one embodiment of the invention: 4,048,729; 4,392,132; 5,093,786; 5,379,213; 5,724,357; 6,021,119; 6,665,000; 7,277,671; 7,403,111; 7,599,703; 5,883,582; 5,929,777; 5,929,779; 6,069,557; 6,241,364; 7,042,337; 6,577,877; 7,005,965; 7,389,180; 7,746,820; 7,747,261; 6,788,199 and 7,079,009.

There are a number of drawbacks to the tag transmissions of the above-noted prior art relative to the amount of energy required to transmit over infrared carriers, particularly in relation to the much lower amount of energy required to transmit over radio frequency carriers. Systems in the past have used a badge or tag IR transmission containing a serial number in the process of identifying a badge to the system. The length of the IR transmission is a significant determiner of battery life for the badges and a significant component of the length of the IR transmission is the serial number of the badge. Short serial numbers require reuse of serial numbers sooner resulting in possible duplication of badge identities within a facility causing a compromise in the integrity of the whole system. Longer serial numbers solve this problem but seriously reduce battery life. Therefore a design that can reduce the length of the IR packet without giving up a long serial number is invaluable for maximizing battery life.

SUMMARY

An object of at least one embodiment of the present invention is to provide an improved real-time method and system for locating a mobile object or person in a tracking environment.

In carrying out the above object and other objects of at least one embodiment of the present invention, a real-time method of locating a mobile object or person in a tracking environment in which a plurality of sensors are located is provided. The method includes providing a tracking tag wearable by the person or attachable to the object. The method further includes modulating a first carrier signal with a first packet including a first set of data to obtain a modulated first signal. The method still further includes transmitting from the tag to a sensor nearest the tag the first signal. The first signal contains the first packet and has a first precision and a first range within the environment. The method further includes repeating the steps of modulating and transmitting until a modulated second signal is received at the tag from the nearest sensor within a time period after the step of transmitting. The second signal contains a second packet including a second set of data and has a second precision and a second range within the environment. The method still further includes receiving the second signal at the tag within the time period. The method further includes demodulating the second signal to obtain the second packet. The method still further includes determining location of the tag within the environment based on the second packet of the received demodulated second signal.

At least a portion of the second set of data may uniquely identify the nearest sensor.

The first set of data may either non-uniquely or uniquely identify the tag.

The first packet may be an IR packet and the second packet may be an RF packet.

The tracking environment may be a clinical environment.

The method may further include storing at least a portion of the second set of data in the tag to obtain stored data. The method may still further include modulating a third carrier signal with a third packet including the stored data to obtain a modulated third signal. The method may further include transmitting from the tag to a device other than the nearest sensor the third signal. The third signal has a third precision and a third range within the environment.

The tag may be a multi-modal tag.

The first precision may be greater than the second precision and the first range may be shorter than the second range.

The third packet may be an RF packet.

The first precision may be greater than the third precision and the first range may be shorter than the third range.

The first and second signals may be electromagnetic signals.

The first signal may be an IR signal and the second signal may be an RF signal.

The first signal may be a line-of-sight signal and the second signal may be a non-line-of-sight signal.

The first, second and third signals may be electromagnetic signals.

The first signal may be an IR signal and the second and third signals may be RF signals.

The first signal may be a line-of-sight signal and the second and third signals may be non-line-of-sight signals.

The method may further include validating the second packet prior to the step of determining.

The tag may be battery-operated.

Further in carrying out the above object and other objects of at least one embodiment of the present invention, a real-time system of locating a mobile object or person in a tracking environment is provided. The system includes a plurality of sensors located in the tracking environment. The system further includes a tracking tag wearable by the person or attachable to the object. The tag is programmed to at least partially perform the step of modulating a first carrier signal with a first packet including a first set of data to obtain a modulated first signal. The tag is further programmed to at least partially perform the step of transmitting to a sensor nearest the tag the first signal. The first signal contains the first packet and has a first precision and a first range within the environment. The tag is still further programmed to at least partially perform the step of repeating the steps of modulating and transmitting until a modulated second signal is received from the nearest sensor within a time period after the step of transmitting. The second signal contains a second packet including a second set of data and has a second precision and a second range within the environment. The tag is further programmed to at least partially perform the step of receiving the second signal within the time period. The tag is still further programmed to at least partially perform the step of demodulating the second signal to obtain the second packet. The tag is further programmed to at least partially perform the step of determining location of the tag within the environment based on the second packet of the received demodulated second signal.

The tag may be further programmed to at least partially perform the step of storing at least a portion of the second set of data in the tag to obtain stored data. The tag may be still further programmed to at least partially perform the step of modulating a third carrier signal with a third packet including the stored data to obtain a modulated third signal. The tag may be further programmed to at least partially perform the step of transmitting to a device other than the nearest sensor the third signal. The third signal has a third precision and a third range within the environment.

The tag may be further programmed to at least partially perform the step of validating the second packet prior to the step of determining.

The above object and other objects, features, and advantages of at least one embodiment of the present invention are readily apparent from the following detailed description of the best mode for carrying out the invention when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, a method and system constructed in accordance with at least one embodiment of the present invention provides the ability to track staff, patients, or assets within a facility or tracking environment. This is accomplished through the use of badges or tags (used interchangeably herein) on the persons or objects needing to be tracked. To facilitate this, sensors (usually one per room and spaced out in hallways) and other communication links or repeaters are strategically located to provide communications to a gateway port (usually ethernet) into a house IT system (i.e. house data system). Infrared and RF are used between the badges and sensors for acquiring location information and RF is used exclusively by the badges back to the house IT system. Communication means other than IR and RF could also be used.

Figure 1A:
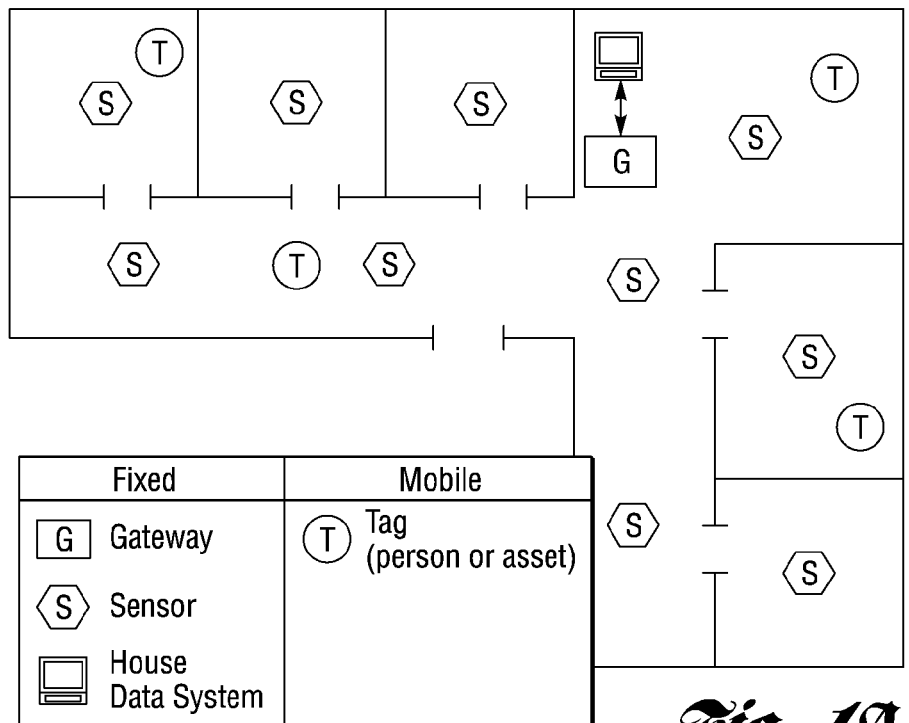
FIG. 1A is a schematic overview diagram and key of a simplified sample facility or tracking environment and illustrating one embodiment of a method and system of the invention.

Referring now to the drawing figures, FIG. 1A illustrates a sample facility installation where the gateway can be located such that the tags and diagnostic communications of the sensors can be received directly by the gateway. Sensors (the IR receivers and RF transceivers) are located in areas where location information is desired. Link modules are not needed.

Figure 1B:
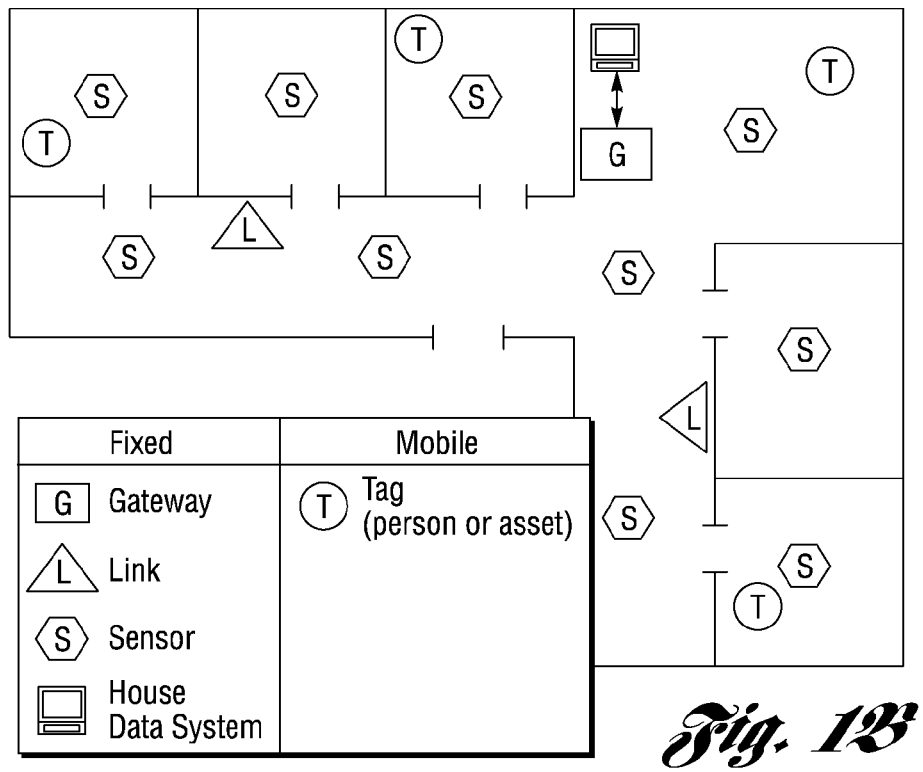
FIG. 1B is a diagram and key similar to the diagram and key of FIG. 1A but of an extended sample facility.

FIG. 1B illustrates a sample larger facility installation where link modules are used to extend the RF coverage. The gateway to the house data system is located so that the distances to the furthest devices are minimized. Sensors (the IR receivers and RF transceivers) are usually located one in each area to be identified. The link modules are placed in locations where they provide the necessary coverage to pick up tags and the relay the diagnostic signals of the sensors.

Figure 2A:
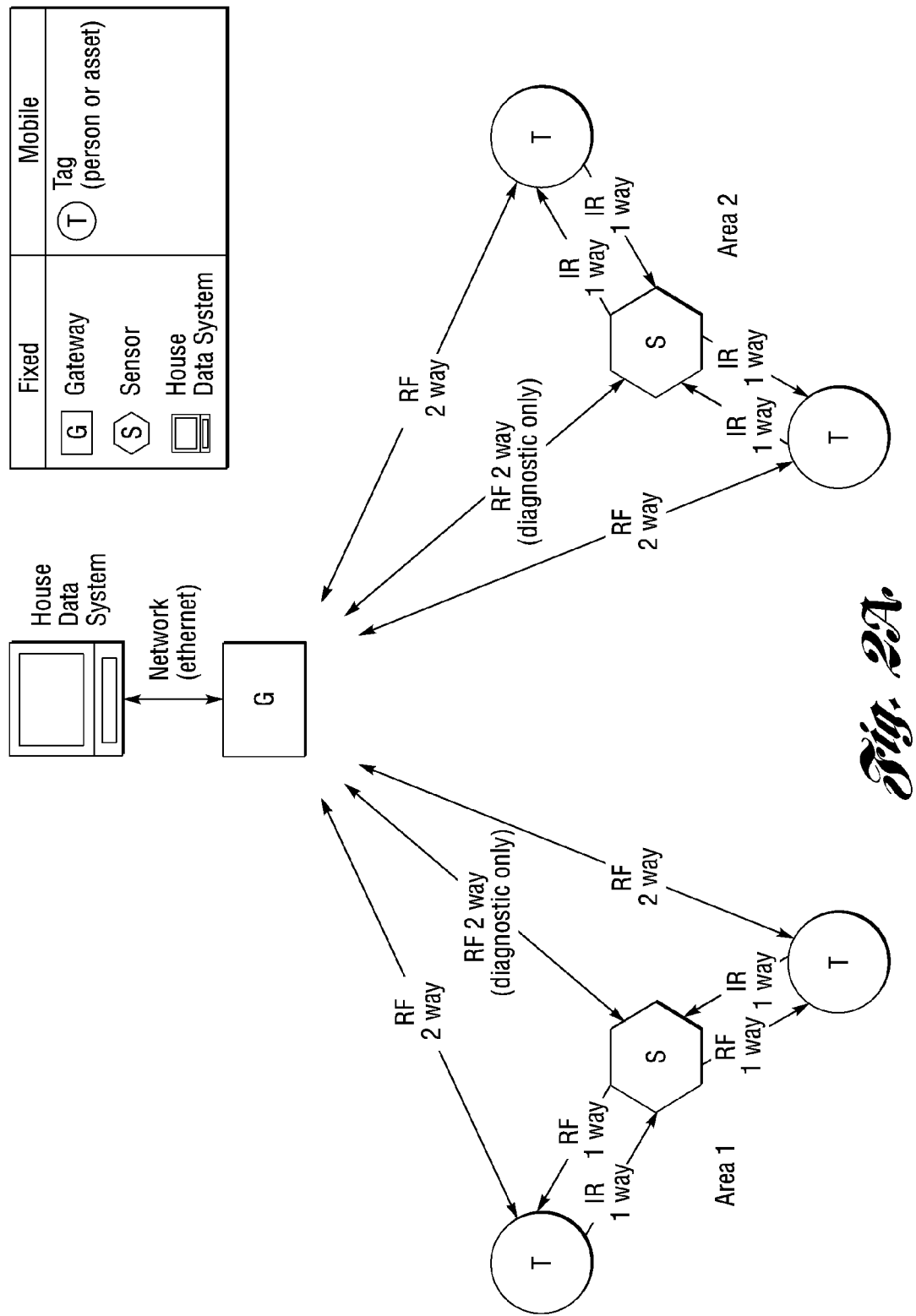
FIG. 2A is a diagram and key similar to the diagram and key of FIG. 1A and particularly illustrating signal flow to and from RF and IR elements or devices.

FIG. 2A illustrates the RF and IR components of the RTLS system for a smaller facility. They are shown identifying their IR and RF communications capabilities. Tags have IR transmit and bidirectional RF capability and can communicate with sensors and a gateway. Sensors have IR receive and bidirectional RF capability and can communicate with tags and a gateway. The gateway has bidirectional RF capability for communicating with tags and sensors along with a network interface which is typically ethernet to communicate with the house data system.

Figure 2B:
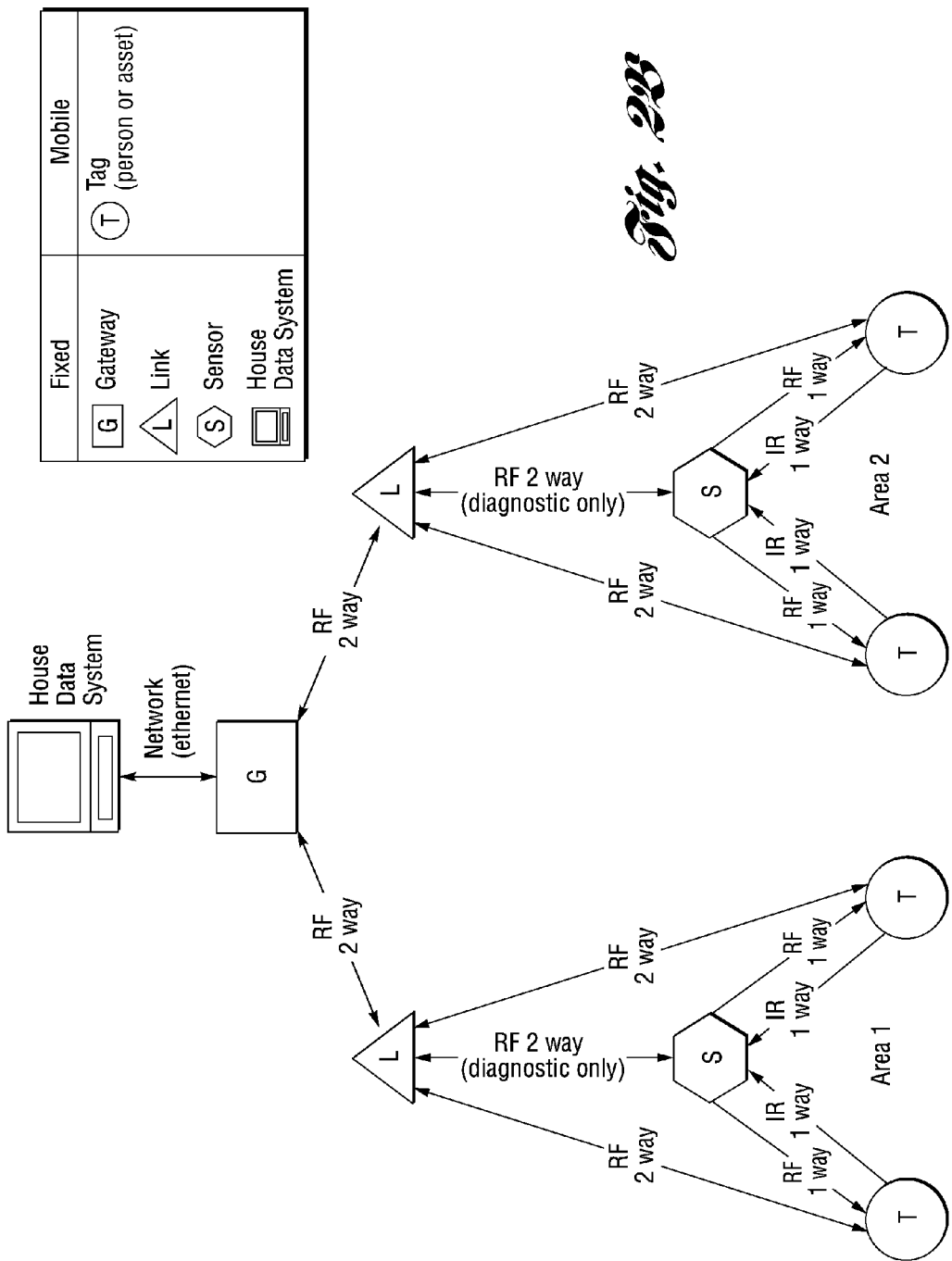
FIG. 2B is a diagram and key similar to the diagram and key of FIG. 1B and particularly illustrating signal flow to and from RF and IR elements or devices.

FIG. 2B illustrates the RF and IR components of the RTLS system for a larger facility and are shown identifying their IR and RF communications capabilities. Tags have IR transmit and bidirectional RF capability and can communicate with sensors and links. Link modules have bidirectional RF capability only and are capable of communicating with tags, sensors, and a gateway. Sensors typically have IR receive and bidirectional RF capability. The gateway has bidirectional RF capability for communicating with links along with a network interface which is typically ethernet to communicate with the house data system.

Figure 3A:
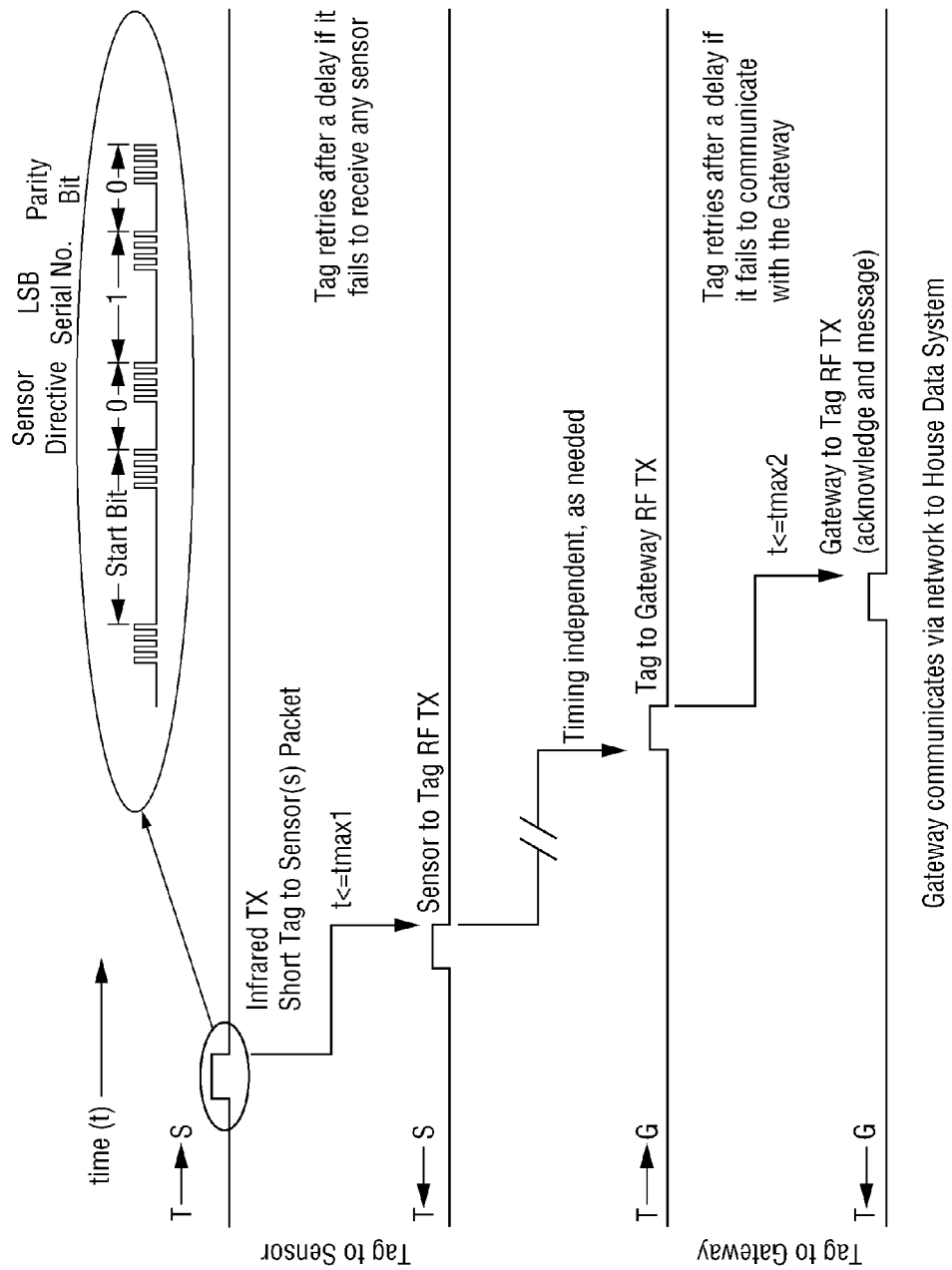
FIG. 3A is a communications timing diagram for the small facility system of FIGS. 1A and 2A.

FIG. 3A illustrates, based on an event such as from a timer or switch closure, a tag which transmits a short IR packet consisting of a start bit and a few other bits to convey data such as mode and/or error checking Compared to previous architectures where the serial number of the tag was embedded this packet length results in a length reduction typically greater than 10 to 1. With current IR devices, the IR transmission length can be on the order of 4-8 milliseconds or less compared to systems where the data bits required to convey the serial number require a transmission length more on the order of 70-80 milliseconds or 10% or less of what was required with the serial number embedded. This has a number of important benefits:
1. Significant reduction in battery drain since the power needed for the IR transmission consumption is a major determiner of battery life;
2. Reduces the probability of collisions and retries to as little as one-tenth or less since shorter packets are less likely to collide;
3. Makes possible support for longer serial numbers with lengths supported to 32 bits or more since the serial number is handled in the RF communication (much higher RF data rate of 250 KBPS) and not in the IR (2 KBPS data rate for IR). While higher IR data rates are possible, this takes a toll on range and renders the location determination compromised. Previous systems with embedded IR serial numbers had limitations typically set to 16 bits in the serial number to minimize the IR length but this shorter length results in only 65,536 unique serial numbers. Consequently, rollovers (duplication) of serial numbers at a customer site compromises system integrity and makes for problems in the marketplace.

In the small facility configuration, the tag acquires its location by sending a short IR message and receiving an RF transmission from a nearby sensor. If no response is received after a predetermined delay, the tag will retry. This process is continued on a predetermined schedule by a tag so that it is always up to date with the location ID (sensor serial number) that is nearest.

On an independent schedule, the tag can pass on its location ID to a gateway to communicate to the house data system its current location. Previous designs required this to occur as part of the communication with the sensor. This architecture permits it to occur only as needed such as on location change which results in fewer RF transmissions reducing the likelihood of collisions and increasing battery life.

Figure 3B:
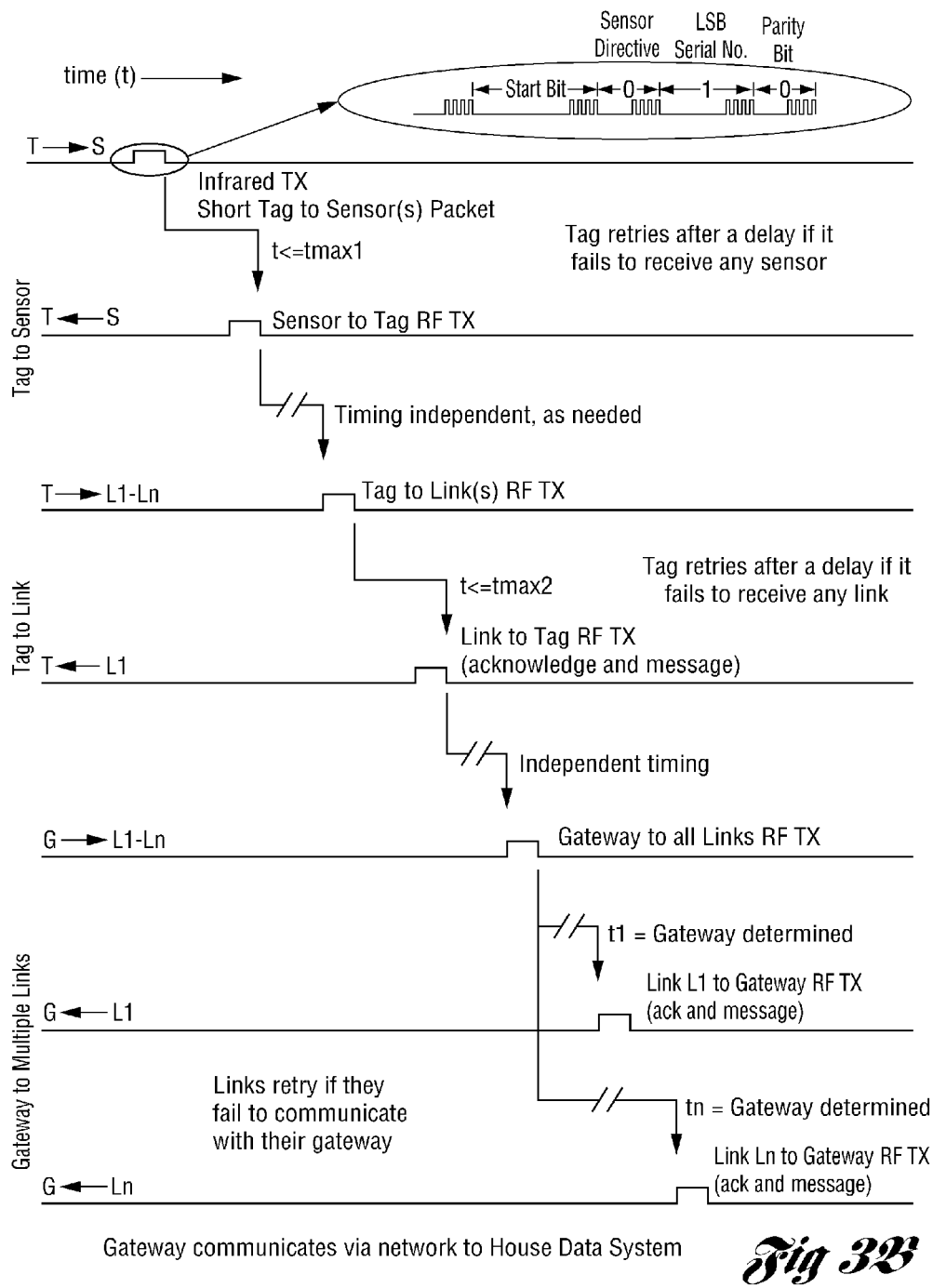
FIG. 3B is a communications timing diagram for the extended system of FIGS. 1B and 2B.

FIG. 3B illustrates in a larger facility where RF range may be a problem. Link modules may be employed to enable tags and sensors to communicate with the gateway at a much greater distance. The process of the tag in acquiring location information (nearest sensor's serial number) is the same as with a smaller system but the link modules enable communication at a greater distance by repeating the tag communications to and from the gateway.

Figure 4:
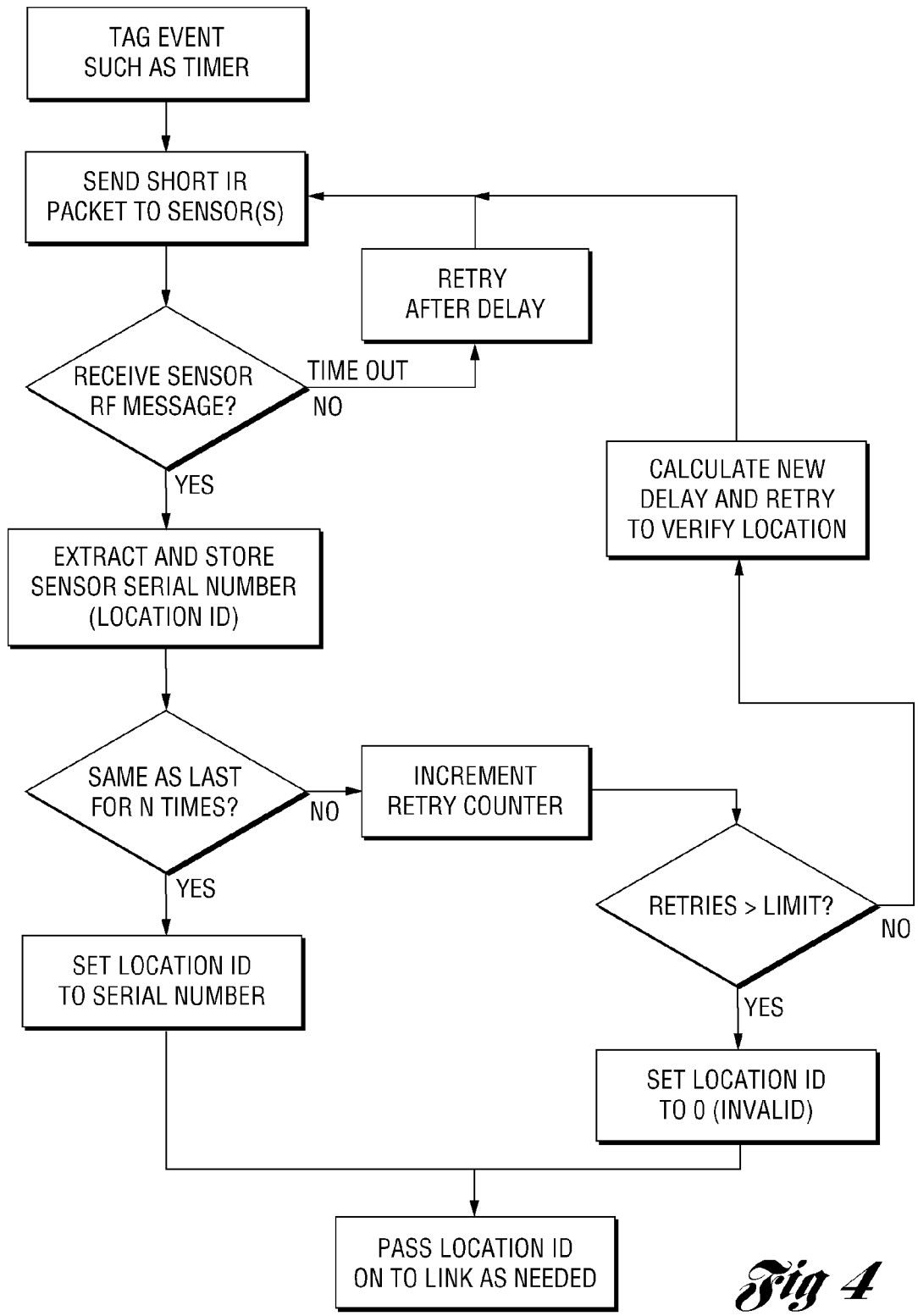
FIG. 4 is a block diagram flow chart illustrating acquisition and validation of location ID with regard to a tag and a sensor.

The flow chart of FIG. 4 demonstrates the process by which the tag acquires and validates its location ID. The tag sends a short IR packet to the sensor(s). It expects an RF message back from the nearest sensor. A timeout is employed to prevent the tag from waiting an unreasonable amount of time and if no message is received the tag will, after a predetermined time delay, try again with another IR packet. When an RF packet from a sensor is received, the tag conditions its acceptance as a location by comparing with previous location IDs. If the same location ID is not received n times in a row, it will not accept the new location ID. This validation process is desirable because the possibility exists that two tags in adjacent areas might coincide time-wise in communicating with different sensors and the sensor RF message that a tag receives could be from a sensor in a nearby area and not the one it sent its IR packet to. The validation process consists of receiving a location ID from a sensor and doing this several times with varied programmable delays so that no two tags would be communicating successively with the same sensor to make it through the validation process.

If a tag fails to communicate or validate with any sensor within a predetermined number of attempts, the location ID will be set to a value such as zero to designate that no validated location information has been received by the tag.

The validation process is the same whether or not link modules are used to extend communication with the gateway.

Figure 5A:
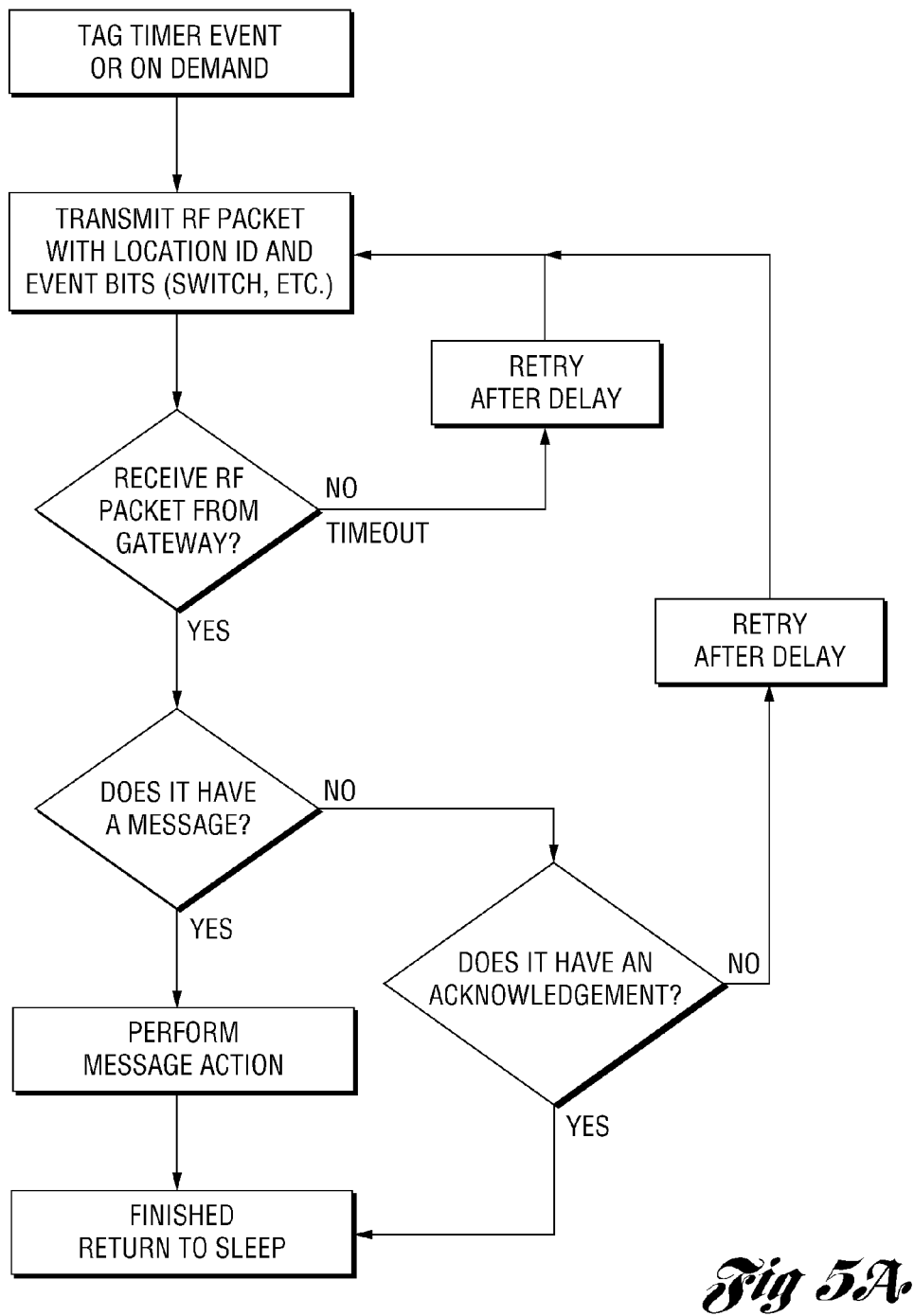
FIG. 5A is a block diagram flow chart illustrating communications with a house system with respect to a tag and a gateway in a small facility.

FIG. 5A illustrates that in a smaller facility at predetermined time intervals the tag transmits an RF packet to the gateway. It looks for a return gateway RF packet and if not received within a predetermined amount of time it delays and retries the process. When it receives a gateway packet, it extracts its message or acknowledgment and acts on the message or goes to sleep if acknowledged.

Figure 5B:
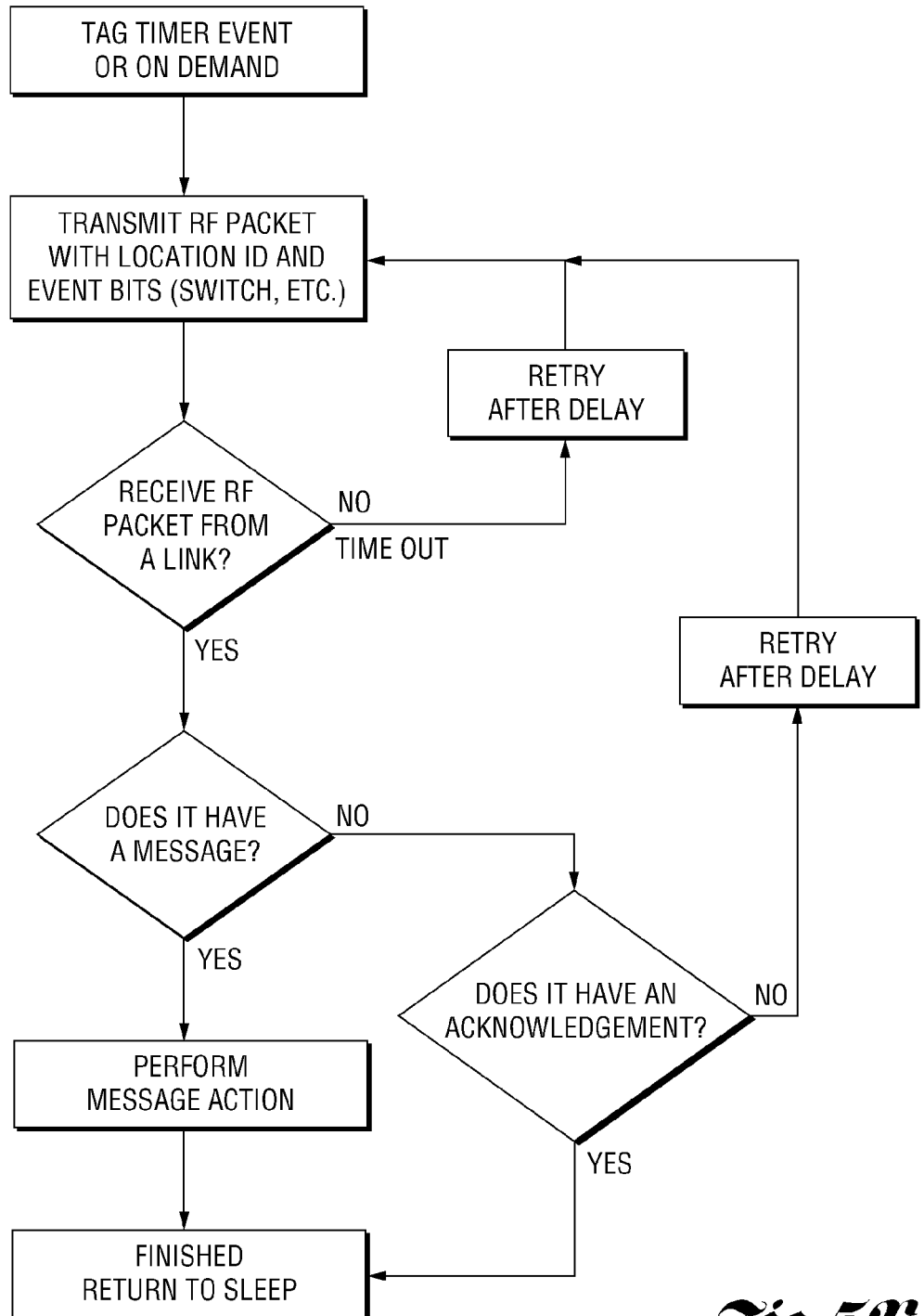
FIG. 5B is a chart similar to the chart of FIG. 5A but with respect to a tag and a link in an extended facility.

FIG. 5B illustrates that, similar to the smaller facility in a larger system, link modules are used to extend the range. In this case, the tag transmits an RF packet to a link module. The link module passes this on to the gateway and receives a return message. The tag waits for an acknowledgment or message and retries with the link module if it does not receive one. It acts on the message or goes to sleep if acknowledged.

Figure 6:
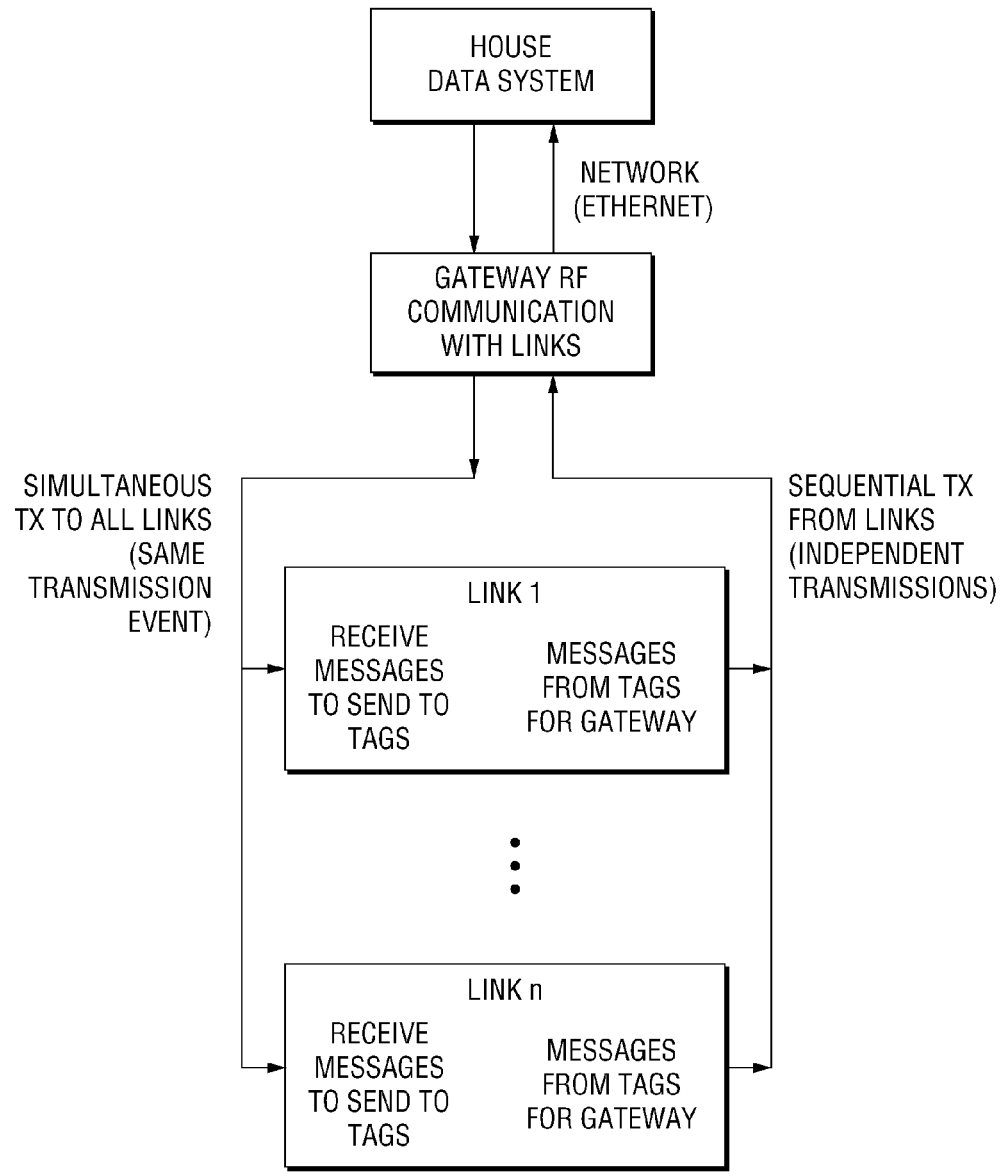
FIG. 6 is a block diagram flow chart illustrating communications between a gateway and link(s)

FIG. 6 illustrates that, for extended range systems, the gateways and tags communicate by going through link modules which receive the tag messages and pass them on to the gateway and receive the gateway messages and pass them on to the tags.

Figure 7:
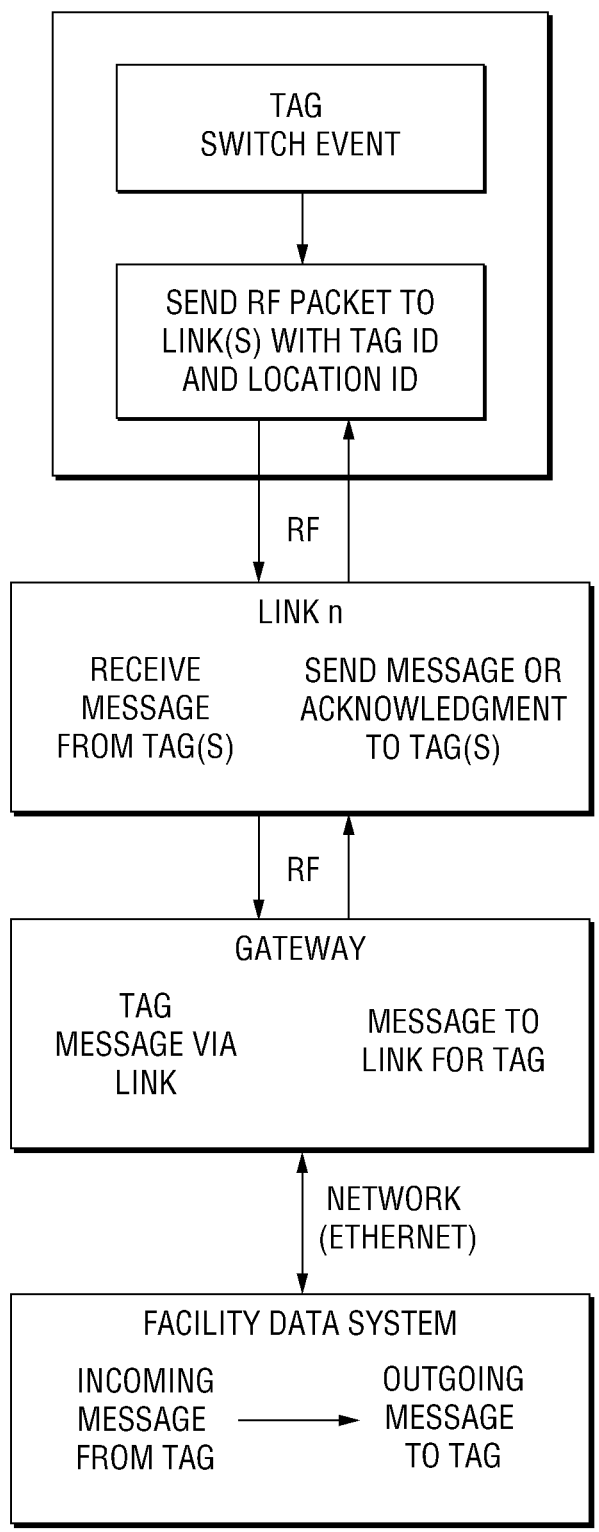
FIG. 7 is a block diagram flow chart illustrating communications initiated by a tag switch event.

FIG. 7 illustrates that if a switch on the tag is closed or certain other events happen on the tag, the tag will, after a predetermined delay, send a message to a link(s) or in the case of a smaller facility (no links) directly to a gateway. It will then wait for a return message or acknowledgment. If the exchange is not successful, it will retry after a predetermined delay until successful.

Figure 8:
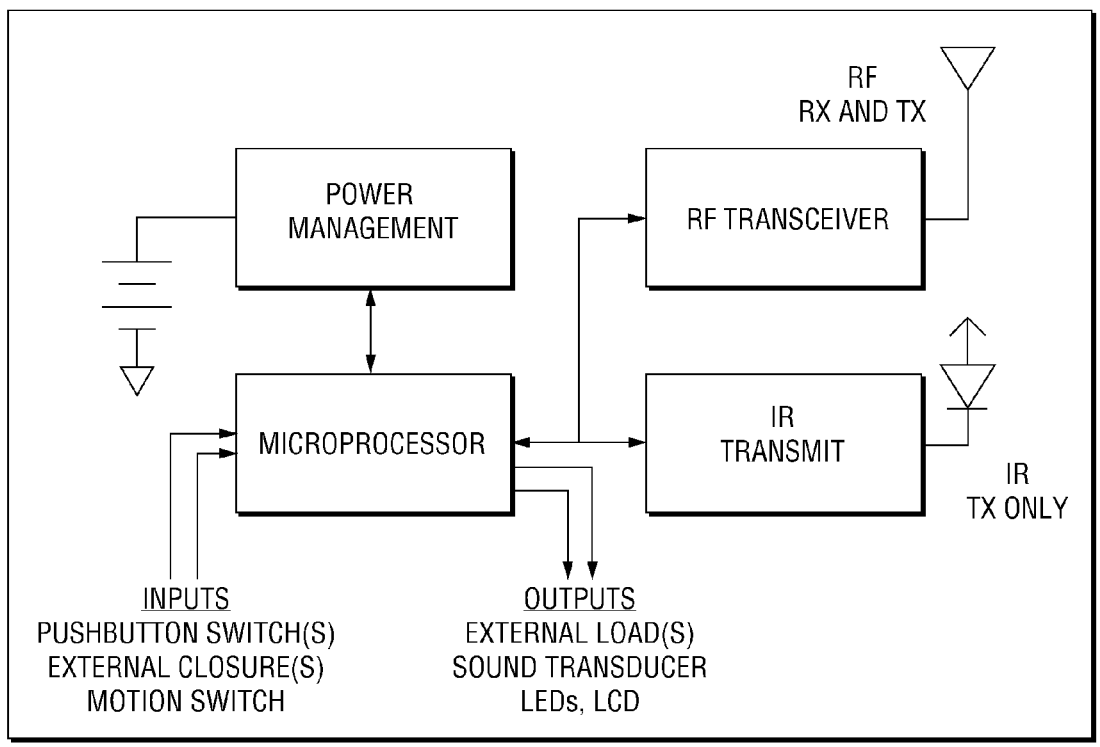
FIG. 8 is a schematic block diagram illustrating a tag or badge constructed in accordance with at least one embodiment of the present invention.

FIG. 8 illustrates a block diagram showing the major elements of a tag. The "brains" of the tag is a microprocessor which composes and sends the IR transmit packets and composes, sends and receives the RF packets. It also interacts with a motion detector (to reduce tag functionality during inactivity for battery conservation and reduced IR/RF traffic), switch (es), an RF transceiver, an IR transmitter, displays messages on an LED or LCD, and provides power management.

The following is a description of the approach that allows for minimizing the badge IR packet length while supporting long serial numbers.

A badge containing an IR transmitter and an RF transceiver at programmable intervals sends a short infrared packet which is picked up by a nearby sensor which includes an IR receiver and an RF transceiver, among other things. This infrared packet consists of a unique bit pattern, some of which may be an error detection bit(s) such as parity, checksum or CRC for the packet. One or more of the bits of the badge serial number may also be included in the packet to help reduce the chance of a misidentification and subsequent need for retry. An additional bit or more may be also employed to convey to the sensor a particular RF channel(s) to be used in responding or other mode controlling functionality. In its simplest form the IR packet is non-unique for all badges and in its more advanced form is unique to each badge.

The sensor, upon receiving a badge IR transmission, responds by transmitting an RF packet in part consisting of the sensor serial number (its ID). The exact time occurrence of this transmission from the sensor to the badge is not critical other than that it should occur within a reasonable period of time to preserve badge battery life since the receiver in the badge needs to be active until the RF transmission from the sensor has been received. If the RF transmission is not received within a reasonable interval, the badge will reinitiate the process.

Upon successful return of an RF transmission from the sensor, the badge extracts the sensor serial number and compares it with the last received sensor serial number. If it is the same, the badge accepts this sensor ID as its current location. The badge is responsible to keep track of the sensor ID as its location. Any time a sensor ID is received that is different from the previous, an additional exchange is desired for validation and it may be advantageous for the validation exchange to happen quicker than the normal period so as not to introduce any significant delay in the adoption of a new sensor location ID.

The maintenance of location information in the badge allows it to pass this information on through a link to the gateway and house system on its own schedule and with a process independent of the sensors.

In the event of sensor RF transmissions being received by a badge from different locations simultaneously, there are several possibilities:

The collision of the transmissions can cause neither to be received, in which case after a delay the badge retries. Different badges would have different retry delays to avoid subsequent sensor RF collisions.

The wrong transmission wins out. If a new location is indicated, a validation process would be performed before being accepted by the badge as a new location. Different badges would have different validation retry delays to avoid subsequent sensor RF collisions.

The right transmission wins out, in which case the process was successful and if its sensor ID matches the previous one and the location is adopted. If it is different, it is recorded but not adopted until validated by a subsequent sequence.

This approach has a number of strengths:

1. Badge IR transmissions can be very short and only single sensor RF transmissions are needed for the badge to learn its location.
2. The identification process is robust in that any badge change in location should go through a validation process.
3. The badge communication only needs to be a single one-way IR transmission to the sensor.
4. Sensor communication only needs to be a one-way RF transmission to the badge.
5. Communication timing between the badge and sensor is not critical other than that it should occur within a reasonable time to not affect battery life.
6. Latency between the badge and house system is optimal since the sensor is not a part of that process.
7. Call functions from the badge and messaging to the badge, as well as prioritization of communications to and from the badge, do not involve the sensor and can be optimized independently.
8. The amount of activity on the part of the sensor is minimal resulting in less sensor current drain making its operation on battery power practical.
9. The fact that the sensor may have bidirectional RF capability allows diagnostic and supervisory functions between the system and sensors independent of the badges.

There are a number of events that can be used to cause a badge to perform an infrared transmission to provide an update of a badge or tag location, some of which are:

a specific (and programmable) timer function with the badge;
a user event such as a button press;
a specific biometric input to the badge;
an external trigger input; and
as commanded by the link.

At least one embodiment of the present invention provides one or more of the following features:

Collisions

The short IR packet, besides helping with battery life on the packet itself, also helps with minimizing collisions in two additional ways: one, because of the reduced packet length; and second, the frequency of occurrence of the IR packets can be reduced since the badges are aware of when they have successfully communicated with a sensor. In a one-way system where a badge never knows if it has been heard by a sensor, it therefore has to transmit on a more frequent basis. Being able to optimize the fire rate based on success helps both on collisions and also on battery life independent of the packet length factor.

Validation

This is provided to prevent misinterpretation of a location because of RF transmissions crisscrossing in a common area shared by two sensors when two badges in nearby areas happen to run in sync. In the architecture one may choose to validate two or more times (up to some limit such as five) before one accepts a new location. One can also accelerate the rate of retries during a validation sequence to reduce the impact of the retries on latency so the validation of location does not have to exact a toll on latency.

Communication

The badges are aware when they fail to communicate with a sensor for some period of time and can convey that information (the fact that they have not communicated with a sensor) to a link and gateway to the house data system.

Diagnostics

Because of the two-way RF communication capabilities that the sensors may possess, they can communicate with links on a periodic basis for diagnostic purposes to identify system problems at an early stage and improve system reliability.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A real-time method of locating a mobile object or person in a tracking environment in which a plurality of sensors are located, the method comprising:
   (a) providing a tracking tag wearable by the person or attachable to the object;
   (b) modulating a first carrier signal with a first packet including a first set of data to obtain a modulated first signal;
   (c) transmitting from the tag to a sensor nearest the tag the first signal, the first signal containing the first packet and having a first precision and a first range within the environment;
   (d) repeating steps (b) and (c) until a modulated second signal is received at the tag from the nearest sensor within a time period after step (c), the second signal containing a second packet including a second set of data and having a second precision and a second range within the environment;
   (e) receiving the second signal at the tag within the time period;
   (f) demodulating the second signal to obtain the second packet; and
   (g) determining location of the tag within the environment based on the second packet of the received demodulated second signal.

2. The method as claimed in claim 1 wherein at least a portion of the second set of data uniquely identifies the nearest sensor.

3. The method as claimed in claim 1 wherein the first set of data non-uniquely identifies the tag.

4. The method as claimed in claim 1 wherein the first set of data uniquely identifies the tag.

5. The method as claimed in claim 1 wherein the first packet is an IR packet.

6. The method as claimed in claim 1 wherein the second packet is an RF packet.

7. The method as claimed in claim 1 wherein the tracking environment is a clinical environment.

8. The method as claimed in claim 1 further comprising:
   storing the at least a portion of the second set of data in the tag to obtain stored data;
   modulating a third carrier signal with a third packet including the stored data to obtain a modulated third signal; and
   transmitting from the tag to a device other than the nearest sensor the third signal, the third signal having a third precision and a third range within the environment.

9. The method as claimed in claim 1 wherein the tag is a multi-modal tag.

10. The method as claimed in claim 1 wherein the first precision is greater than the second precision and the first range is shorter than the second range.

11. The method as claimed in claim 8 wherein the third packet is an RF packet.

12. The method as claimed in claim 8 wherein the first precision is greater than the third precision and the first range is shorter than the third range.

13. The method as claimed in claim 1 wherein the first and second signals are electromagnetic signals.

14. The method as claimed in claim 13 wherein the first signal is an IR signal and the second signal is an RF signal.

15. The method as claimed in claim 1 wherein the first signal is a line-of-sight signal and the second signal is a non-line-of-sight signal.

16. The method as claimed in claim 8 wherein the first, second and third signals are electromagnetic signals.

17. The method as claimed in claim 16 wherein the first signal is an IR signal and the second and third signals are RF signals.

18. The method as claimed in claim 8 wherein the first signal is a line-of-sight signal and the second and third signals are non-line-of-sight signals.

19. The method as claimed in claim 1 further comprising validating the second packet prior to the step of determining.

20. The method as claimed in claim 1 wherein the tag is battery-operated.

21. A real-time system of locating a mobile object or person in a tracking environment, the system comprising:
   a plurality of sensors located in the tracking environment; and
   a tracking tag wearable by the person or attachable to the object, the tag being programmed to at least perform the steps of:
   (a) modulating a first carrier signal with a first packet including a first set of data to obtain a modulated first signal;
   (b) transmitting to a sensor nearest the tag the first signal, the first signal containing the first packet and having a first precision and a first range within the environment;
   (c) repeating steps (a) and (b) until a modulated second signal is received from the nearest sensor within a time period after step (b), the second signal containing a second packet including a second set of data and having a second precision and a second range within the environment;
   (d) receiving the second signal within the time period;
   (e) demodulating the second signal to obtain the second packet; and
   (f) determining location of the tag within the environment based on the second packet of the received demodulated second signal.

22. The system as claimed in claim 21 wherein at least a portion of the second set of data uniquely identifies the nearest sensor.

23. The system as claimed in claim 21 wherein the first set of data non-uniquely identifies the tag.

24. The system as claimed in claim 21 wherein the first set of data uniquely identifies the tag.

25. The system as claimed in claim 21 wherein the first packet is an IR packet.

26. The system as claimed in claim 21 wherein the second packet is an RF packet.

27. The system as claimed in claim 21 wherein the tracking environment is a clinical environment.

28. The system as claimed in claim 21 wherein the tag is further programmed to at least partially perform the steps of:

storing the at least a portion of the second set of data in the tag to obtain stored data;

modulating a third carrier signal with a third packet including the stored data to obtain a modulated third signal; and transmitting to a device other than the nearest sensor the third signal, the third signal having a third precision and a third range within the environment.

29. The system as claimed in claim 21 wherein the tag is a multi-modal tag.

30. The system as claimed in claim 21 wherein the first precision is greater than the second precision and the first range is shorter than the second range.

31. The system as claimed in claim 28 wherein the third packet is an RF packet.

32. The system as claimed in claim 28 wherein the first precision is greater than the third precision and the first range is shorter than the third range.

33. The system as claimed in claim 21 wherein the first and second signals are electromagnetic signals.

34. The system as claimed in claim 33 wherein the first signal is an IR signal and the second signal is an RF signal.

35. The system as claimed in claim 21 wherein the first signal is a line-of-sight signal and the second signal is a non-line-of-sight signal.

36. The system as claimed in claim 28 wherein the first, second and third signals are electromagnetic signals.

37. The system as claimed in claim 36 wherein the first signal is an IR signal and the second and third signals are RF signals.

38. The system as claimed in claim 28 wherein the first signal is a line-of-sight signal and the second and third signals are non-line-of-sight signals.

39. The system as claimed in claim 21 wherein the tag is further programmed to at least partially perform the step of validating the second packet prior to the step of determining.

40. The system as claimed in claim 21 wherein the tag is battery-operated.

* * * * *